Figure 1:
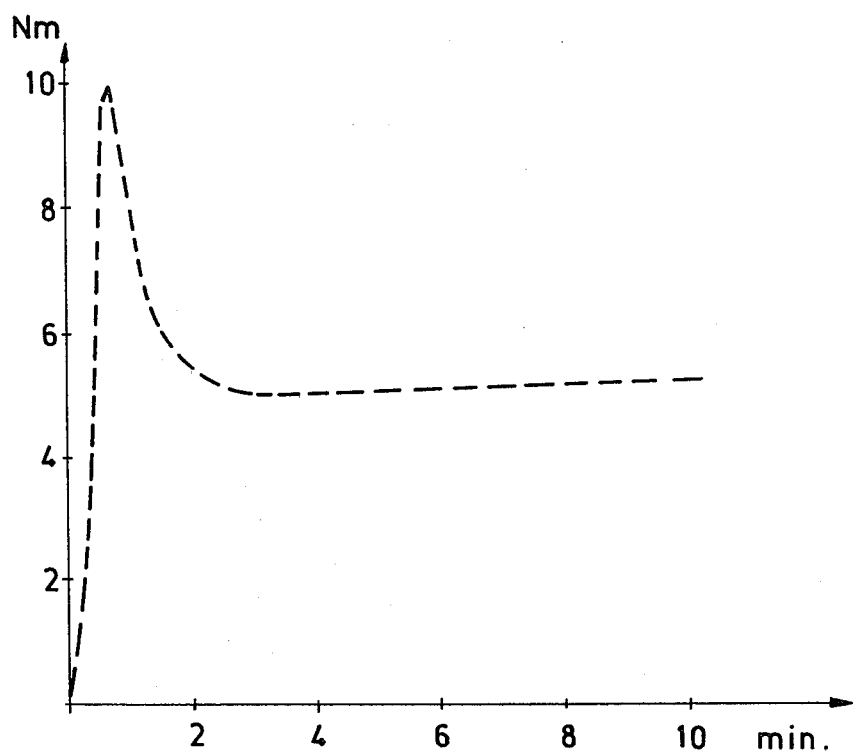

United States Patent [19]

Czvikovszky et al.

[11] Patent Number: 4,464,510
[45] Date of Patent: Aug. 7, 1984

[54] PROCESS FOR THE PREPARATION OF A MATERIAL OF COMPOSITE STRUCTURE

[75] Inventors: Tibor J. Czvikovszky; Tamás Pazonyi; Lászlóné I. Topolcai; János Klebán, all of Budapest, Hungary

[73] Assignee: Mûanyagipari Kutató Intézet, Budapest, Hungary

[21] Appl. No.: 408,944

[22] Filed: Aug. 17, 1982

[30] Foreign Application Priority Data

Aug. 19, 1981 [HU] Hungary ............................. 2423/81

[51] Int. Cl.³ .................... C08G 83/00; C08H 5/04; C08J 3/24; B29F 1/00
[52] U.S. Cl. ................. 525/54.23; 525/54.21; 525/54.3; 527/100; 527/102; 527/103; 527/311; 527/313; 527/314; 264/331.15
[58] Field of Search ................ 525/54.2, 54.21, 54.23, 525/54.3; 527/100, 101, 102, 103, 300, 311, 313, 314; 264/331.15

[56] References Cited

U.S. PATENT DOCUMENTS 3,485,777 12/1969 Gaylord .............................. 527/314
4,026,849 5/1977 Bagley et al. ........................ 527/313
4,359,548 11/1982 Blount ................................. 527/313
4,374,215 2/1983 Atkins ................................. 527/311

Primary Examiner—John Kight, III
Assistant Examiner—Nathan M. Nutter
Attorney, Agent, or Firm—Keil & Weinkauf

[57] ABSTRACT

The invention relates to a process for the preparation of a material of composite structure containing a thermoplastic plastic and a fibrous polymer skeleton material, having a high modulus of torsional shear, good shockproofness and being processable by the formation technologies of thermoplastic plastics. According to the invention one proceeds in such a way that the fibrous polymer skeleton material is treated with a resin mixture consisting of an unsaturated polyester resin and a vinyl monomer in an amount of 1–80 percent by weight, related to the skeleton material.

The use of the polyester as adhesion-intermediator considerably improves the homogeneity of the material of composite structure, it makes the substance processable without pregranulation on an extruder with a broad slot or a calendrette, and leads to plates the shockproofness of which significantly exceeds that of plates prepared without such intermediator.

4 Claims, 4 Drawing Figures

PROCESS FOR THE PREPARATION OF A MATERIAL OF COMPOSITE STRUCTURE

The invention relates to a process for the preparation of a material of composite structure having a high modulus of torsional shear, good shock-proofness and being processable by the formation technologies of thermoplastic plastics.

The success of the composite materials of high strength and consisting of a fibrous reinforcing agent and a matrix is well known. Beside the plastics reinforced with cut or "infinite" glass fibres, glass quilt or fabric, plastics reinforced with metal fibres, carbonate fibres, special monocrystals (whiskers) or even synthetic polymer fibres, e.g. aromatic polyamide fibres, gain more and more ground.

The thermoformability of the polyolefines and polyvinyl-chloride (PVC) is excellent. However, their use is restricted by the high temperature dependence fo the modulus of torsional shear in contradiction to the acryl-nitrile-butadiene-styrene copolymer (ABS), the polycarbonate and the other "engineering plastics". The possibilities of applying the polyolefine and the PVC plates could be extended in numerous fields if the modulus of torsional shear measurable at room temperature were so increased that it does not decrease too rapidly with rising temperature and that it does not spoil but—if possible—rather improves the cold resistance.

Among the natural polymers the association of woodfibre and wood-flour, respectively, with plastics is as old as the plastics technology itself. Not much later that in the first years of this century L. H. BAEKELAND obtained a patent for a process for preparing phenol-formaldehyde resins, he found that the most advantageous composite material for these resins is wood flour. Since then wood flour has been considered as the still cheaper filling agent of the cheap plastics.

Such composite systems realized before, like e.g. the bakelites filled with wood flour, really belong to the simpler plastics, and due to their moderate technical properties they are more and more ousted from among the modern plastic products.

The main component of the wood substance with fibrous structure, the polymer molecule of the cellulose having the form of a yarn can possess very high solidity in an ideal case. Therefore, recently the natural wood substance having a disperse form attracts more and more attention as filling and, resp., skeleton substance of thermoplastic plastics. Since the middle of the seventies numerous processes were published for the association of polyolefines and PVC with wood-fibre.

According to German patent specification No. 2,427,080 the good connection between wood-fibre and thermoplastic plastics and insensitivity against moisture of the composite material is solved by carrying out a pregranulation. This process does not ensure, however, a chemical connection between the components. A similar process is disclosed in British patent specification No. 1,457,015 according to which the wood-fibre and the thermoplastic polymer are pregranulated, then extruded and calendered. No chemical bond between the components is established in this way either.

According to German patent specification No. 1,911,804 the connection between the matrix and the skeleton substance of polyolefines associated with wood-fibre is improved by modifying one or both of the two main polymer components by the grafting of vinyl monomers initiated with radiation or by other means. The grafting copolymerization carried out on powdery components can be performed, however, only with high monomer losses as it is attested even by this patent specification.

The French patent specification No. 2,370,766 proposes to associate wood-fibre, paper-pulp or waste materials of this base with thermoplastic plastics in such a way that the composite material based on lignocellulose is converted to a copolymer grafted with a vinyl monomer in an aqueous dispersion. Thus, the most important step of the process takes place in a nearly hundredfold quantity of water, related to the basic lignocellulose material, the elimination of which is an expensive and energy-demanding process.

The German patent specification No. 2,850,155 discloses a process in which an adhesion-mediating agent based on silane is added to the composite system consisting of polyolefine and fibrous reinforcing material; this additive, however, significantly increases the costs.

The aim of the invention is the elaboration of such a composite system consisting of thermoplastic plastics, e.g. crystalline polyolefine (polyethylene, polypropylene), or a polyvinyl chloride matrix and a natural polymer fibre which can be readily processed with the formation technologies of thermoplastic plastics (injection moulding, extrusion, calendering, vacuum formation etc.) and the modulus of torsional shear of which increases as compared with that of the starting plastic in such a way that the cold resistance of the composite product does not sink considerably in relation to that of the basic polymer.

The invention is based on the recognition that by using wood-fibre or a similar natural polymer fibre, a fibre-reinforced composite plastic system having good mechanical properties can be formed if the possibility of a chemical connection between the synthetic basic polymer and the fibrous natural polymer is ensured by using an unsaturated polyester resin.

This recognition is surprising because the unsaturated polyester resin—like a polycondensation product with a molecular structure significantly different from that of thermoplastic plastics—has not been used till now for the modification of polypropylene, polyethylene, PVC, polystyrene and other thermoplastic plastics because the unsaturated polyester is basically incompatible with all these polymers. The addition of a thermosetting cross-linking resin system to the thermoplastic plastics is in itself unjustified, too.

Furthermore, the invention is based on the recognition that with the aid of the resin system consisting of unsaturated polyester and vinyl monomer such an adhesion-mediating layer can be formed on the boundary surface of the wood-fibre and the thermoplastic plastic associated with it the chain of which being established in the course of the polymerization of the vinyl monomer component (e.g. styrene) and its copolymerization, respectively, ensures an intermediate chemical connection penetrating through the touching layers of all three polymer phases:

the thermoplastic basic polymer (e.g. polypropylene),
the adhesion-mediating polymer (polyester), and
the natural polymer fibre used as disperse skeleton substance (e.g. wood-fibre).

Accordingly, the invention relates to a process for the preparation of a material of composite structure containing 20–99%, preferably 30–80% of a thermoplastic plastic and 2–80%, preferably 20–60% of a fibrous polymer skeleton material of natural origin, having a high modulus of torsional shear, good shock-proofness and processable by the formation technologies of thermoplastic plastics. According to the invention one proceeds in such a way that the fibrous natural polymer skeleton material is previously treated with a resin mixture consisting of an unsaturated polyester resin and a vinyl monomer in an amount of 1-80 percent by weight, preferably 2-40 percent by weight, related to the skeleton material.

Powdery polyethylene having a flow number of MFI=4 g/10 minutes (measured at a temperature of 230° C. and under a load of 2.16 kp) or polyvinyl chloride characterized by a Fikentscher value of K=70 can be advantageously used as thermoplastic basic polymer.

As natural polymer skeleton material e.g. cellulose fibre, wood-fibre, cotton waste, cut-up leather-fibre and other fibrous products or waste from the agriculture can be advantageously used.

In the process of the invention a resin system consisting of maleic acid-phthalic acid-ethyleneglycol-propyleneglycol polycondensate and vinyl monomers, e.g. styrene, methyl methacrylate, vinyl acetate can be advantageously used as unsaturated polyester resin, in which the average acid number of the polycondensate is 40 mg KOH/g resin, its unsaturation amounts to 18-22% and which contains beside the polycondensate 5-80 percent by weight, suitably 35-65 percent by weight of vinyl monomer.

The condition of the establishing of the chemical connection between the polyester (adhesive intermediate layer) and the fibrous natural polymer skeleton material is given on the double bonds of the polyester. According to the invention one can proceed in such a way that the reaction of the double bonds with the skeleton substance is attained without adding an initiator so that this reaction takes place in the corresponding phase and temperature range, respectively, of the processing technology.

However, one can also proceed in such a way that the reaction between the natural polymer skeleton material and the polyester is initiated by a chemical initiator decomposing under thermal influence or by the previous gamma radiation of the skeleton material.

Benzoylperoxide, cyclohexanoneperoxide or tertiary butylperbenzoate can be advantageously used as thermoplastic initiator (in a quantity of 0.1-3 percent by weight related to the polyester monomer mixture).

Optionally the reaction between the natural polymer fibre and the polyester can be advantageously attained by gamma radiation, too. For this purpose the natural polymer fibre is previously irradiated in the presence of air with a dosage rate of 1-10.000 Gy/h, altogether with a dose of 0.1-100 kGy, preferably with a dose of 0.5-50 kGy.

The main advantages of the process of the invention are as follows:

The use of the unsaturated polyester on the fibrous natural polymer skeleton material is accompanied by significant advantages already in the technological step of making up the powder mixture. The polyester moistens the otherwise unpleasant wood-fibre, leather fibre or other fibrous material from agriculture which flies like powder. The dry blend composed in this way is crumby and not sticking, and can be readily processed.

The advantage of the use of polyester is apparent in the further steps of the technology, too. When it is processed on a roller mill, the continuous sheet formation is more rapid, the intermediate is more homogeneous.

Due to the use of the polyester adhesion mediator the powder mixture consisting of the thermoplastic plastics and the natural polymer fibre can be fed directly, without any pregranulation into a plate producing extruder having a broad slot or into a modern calendrette connecting the technique of extrusion and calendering.

In spite of the fact that—as it has been mentioned above—the thermoplastic plastics, particularly the polyethylene and the propylene, are basically incompatible with the unsaturated polyester resins, the use of the polyester adhesion-mediator on the natural polymer fibre extremely improves the homogeneity of the composite. The plates pressed according to the invention are semi-transparent even in a thickness of 2-3 mm in contradiction to similar plates produced without the use of polyester.

The advantages experienced in the course of the procession, the parameters described and measured in the following examples (procession moment demand, physical-mechanical properties) and the quality of the prepared product equally refer to the fact that a chemical bond is established in the composite material between the natural polymer fibre and the synthetic polymer matrix. This fact advantageously influences all further properties of the novel plastic material of composite structure, e.g. stability, resistance to weather and generally the life, too.

The process of the invention is further illustrated with the aid of the following examples.

EXAMPLE 1

40 parts by weight of wood-fibre (average diameter 10 microns, average length 150 microns, moisture content max. 15%) are added under stirring to 160 parts by weight of unsaturated polyester resin, the latter being a product consisting of 35 percent by weight of maleic acid-phthalic acid-ethyleneglycol-propyleneglycol polycondensate (average acid number; 40 mg KOH/g resin; unsaturation 18-22%) and of 65 percent by weight of styrene monomer.

The wood-fibre is left swelling in the polyester resin for 20 minutes at room temperature; during this time the wood-fibre absorbs altogether 50% of polyester resin, related to its original weight. Thereafter the wood-fibre is filtered off by suction. In this way 85% of the original polyester resin can be recovered and can be used for impregnating the following charge of wood-fibre.

Then the wood-fibre swollen with polyester is admixed with powdery polypropylene (MFI flow number 4 g/10 minutes at a temperature of 230° C., measured under a load of 2.16 kp) in an impeller (produced by PAPPENMEIER, FRG) in a ratio of 60 percent by weight of swollen wood-fibre to 40 percent by weight of polypropylene. After 5 minutes of stirring initiated at room temperature with a speed of 600 rotations/minute a crumb, readily processable mixture is obtained. This basic substance mixture can be directly processed in an extruder with two pulleys, a calender or a calendrette, but for injection moulding pregranulation is necessary.

Figure 2:
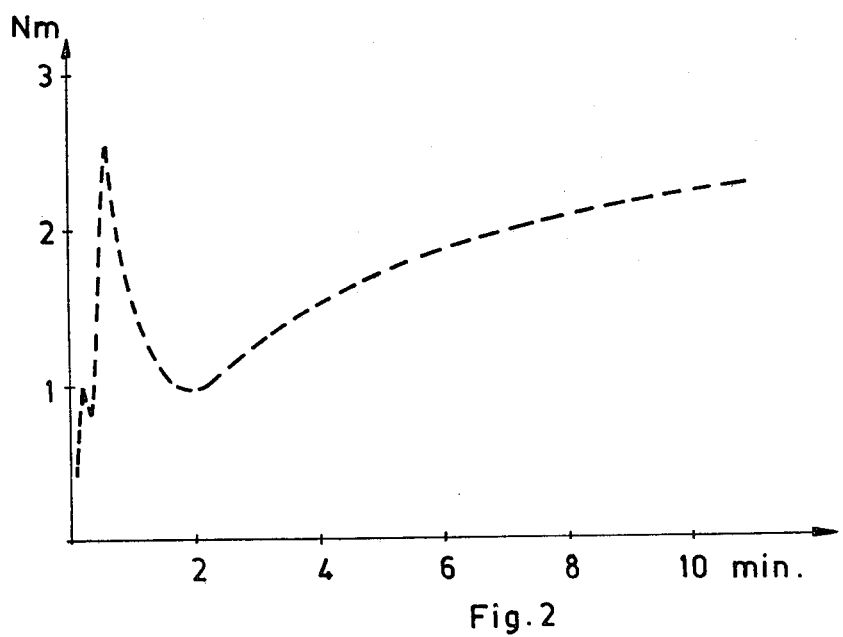

The behaviour of this mixture while processing was studied on a Brabender plastograph. The effect of the additive formed of the unsaturated polyester and vinyl monomer can be well observed at the wood-fibre-PP composite system on the moment take-up diagram of the mixture molten in the kneader chamber of the Brabender plastograph. The kneading moment demand of the 1:1 mixture of wood-fibre and PP in the kneader chamber W 30 H at a temperature of 180° C. is shown in FIG. 1. The moment demand taken 10 minutes later which can be considered as demand of equilibrium can be reduced to half its value—beside otherwise commensurate parameters—if the wood-fibre is modified by 30 percent by weight of polyester monomer mixture related to the total mixture of the system. This is illustrated in FIG. 2 where it can be seen that, due to the reactivity of the polyester resin which is caused by its unsaturation, the moment demand slowly increases without the use of any initiator, too, while kneading the composite system. However, this increase does not mean an irreconcilable difficulty in the reasonable time range necessary for the procession.

Curve 2 unambiguously refers to the formation of a chemical bond in the system processed at high temperature.

From the samples composed in the Brabender kneader chamber plates with a thickness of 2.5 mm were prepared by pressing. The samples were prepared as follows:
  preheating between the plates of the pressing machine (produced by Schwabenthan, FRG) without any pressure at a temperature of 185° C. for 5 minutes;
  rolling on a laboratory roller mill at a temperature of 190° C. for 5 minutes; formation of sheets of 0.3 mm thickness;
  pressing at a temperature of 180° C. with 5 minutes of preheating; started without any pressure; then continued at 180° C. for 3 minutes at a pressure of 22 N/mm², followed by cooling to 40° C. within 10 minutes.

The DYNSTAT bending strength of the homogeneous tough plates amounted to 35 N/mm² (in contradication to the plate of polypropylene filled with ICI wood-fibre which had a DYNSTAT strength of 28 N/mm²).

EXAMPLE 2

One proceeds as in Example 1 with the difference that 1 percent by weight of benzoyl peroxide initiator is added to the polyester used for pretreating the wood-fibre. The polyester resin recovered after the vacuum filtration can be reused here, too, if the initiated resin is stored cool until the following application.

Figure 3:
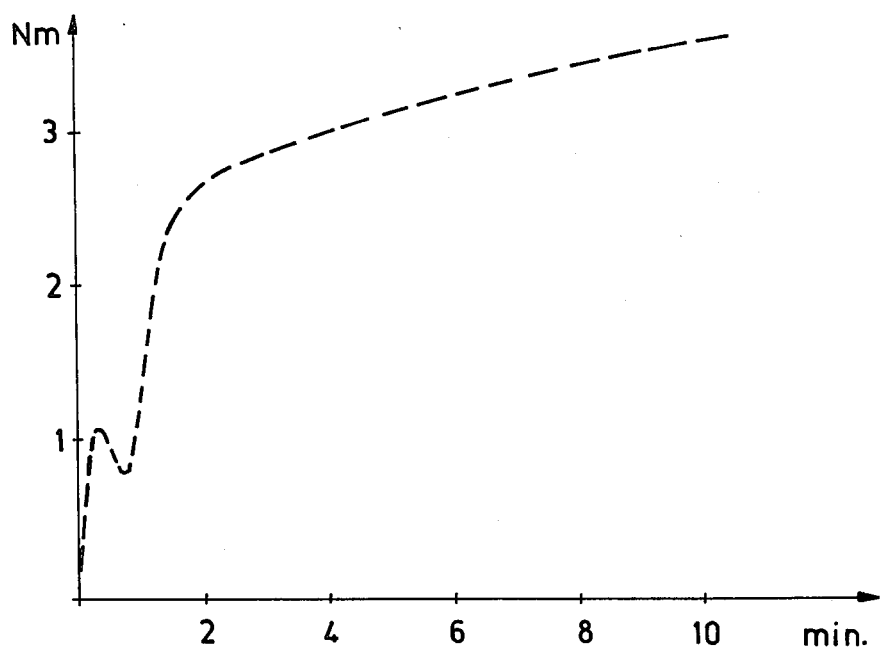

The Brabender plastogram taken for by maintaining all other parameters identically is illustrated in FIG. 3 for the composite containing wood-fibre treated with initiated resin. The moment increase proving the chemical reaction is higher here than in FIG. 2.

The DYNSTAT bending strength of the pressed plates prepared as in Example 1 was 36 N/mm².

EXAMPLE 3

One proceeds as in Example 1 with the difference that the wood-fibre is pretreated with ionizing radiation before the admixing with the polyester resin. The irradiation is carried out at room temperature in a sack permeable to air by using a 60 Co gamma radiation source. By using a dosage rate of 0.2 kGy/h and an irradiation time of 50 hours the air-dry wood-fibre is irradiated with a dose of 10 kGy.

Figure 4:
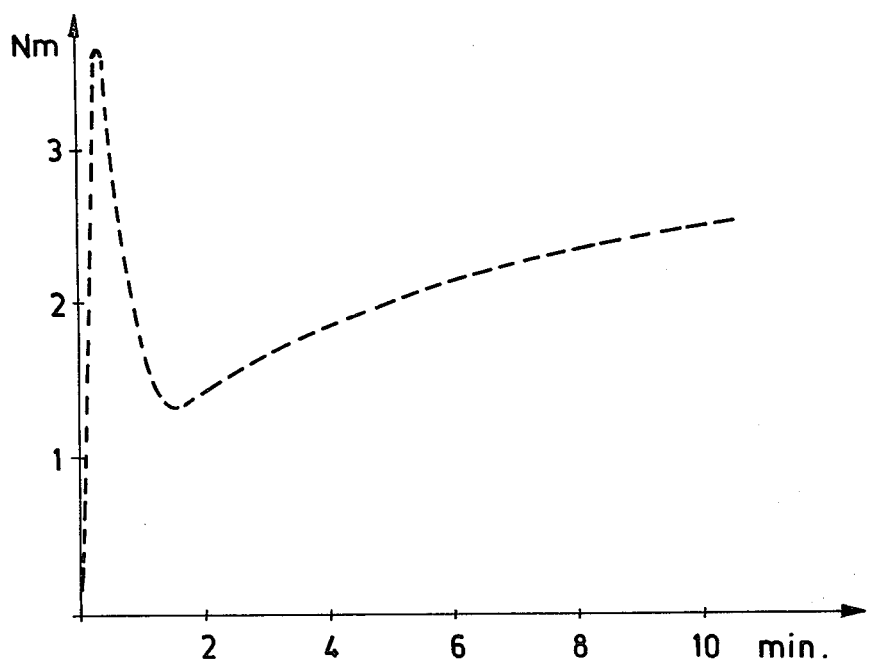

The Brabender plastogram of the mixture prepared as in Example 1 as shown in FIG. 4. The nearly equilibrium moment obtained after 10 minutes of kneading is higher than in FIG. 2. This means an increased reactivity but it is lower than in the case of adding benzoyl peroxide; thus, the process can be readily controlled. The diagram proves the taking place of a chemical reaction between the wood-fibre and the polyester resin. On using wood-fibre pretreated with radiation the DYNSTAT bending strength of pressed plates prepared similarly as in Example 1 was 37 N/mm² beside otherwise commensurate parameters.

EXAMPLE 4

1000 parts by weight of wood-fibre (average diameter 10 micron, average length 150 micron, moisture content max 15%) pretreated wth a radiation dose of 10 kGy as in Example 3 are admixed with 250 parts by weight of polyester resin (styrene monomer content 35%) in an impeller suitable for the plant preparation of a plastics powder mixture (produced by the firm PAPEN-MEIER, FGR). Stirring is continued at a speed of 600 rotations/minute for 10 minutes, during this time the temperature of the powder mixture rises from room temperature to about 45° C. due to the heat of friction. The wood-fibre readily absorbs the polyester resin. The mixture is crumby and suitable for further procession.

The further procession is carried out in the same impeller. 1000 parts by weight of powdery polypropylene (MFI as in Example 1), furthermore 10 parts by weight of Ca-stearate lubricant and 1 part by weight of antioxidant (e.g. IRGANOX 1010, produced by CIBA-GEIGY, Basel, Switzerland) are added to the above mixture. Thereafter the system is stirred for further 10 minutes whereupon the temperature rises to 65° C.

The thus-obtained mixture can be processed on a roller mill and by calendering or granulation and injection moulding but it can be fed into a calendrette or an extruder with a broad slot without granulation as well.

The DYNSTAT bending strength of the 2.5 mm thick plate obtained by pressing the composite material prepared in the above manner is 40 N/mm². The plate can be excellently processed by vacuum formation.

I claim:

1. A process for the preparation of a thermoplastic material of a composite structure containing 20–98% by weight, preferably 30–80% by weight, of a thermoplastic basic plastic, including polyethylene, polypropylene or polyvinyl chloride, and 2–80% by weight, preferably 20–60% by weight of a fibrous polymer skeleton material of natural origin, the thermoplastic material having a high modulus of torsional shear, good shockproofness and being processable by the formation technologies of thermoplastic plastics, characterized in that the fibrous polymer skeleton material is previously treated with a resin mixture consisting of an unsaturated polyester resin and a vinyl monomer in an amount 1–80% by weight, preferably 2–40% by weight, related to the skeleton material.

2. A process as claimed in claim 1, in which the system is submitted to a treatment comprising stirring the fibrous skeleton material and the unsaturated polyester resin, allowing the mixture to swell, suctioning off excess resin to be reused, and then admixing the thermoplastic basic polymer, thereby promoting the reaction between the fibrous polymer skeleton material and the matrix comprising the thermoplastic basic plastic and the unsaturated polyester resin, the resulting mixture is then readily processable by the formation technologies of thermoplastic plastics, including injection molding, extrusion, calendering vacuum formation, and die-casting.

3. A process as claimed in claim 2, characterized in that the treatment is carried out with 0.1–3% by weight of chemical initiator added to the polyester.

4. A process as claimed in claim 2, characterized in that the natural fibrous polymer is irradiated with ionizing radiation of a dose of 0.1–100 kGy, preferably 0.5–50 kGy, in the presence of air.

* * * * *